(12) United States Patent
Otake

(10) Patent No.: US 12,175,643 B2
(45) Date of Patent: Dec. 24, 2024

(54) IMAGE PROCESSING APPARATUS IDENTIFIES A LINE IN A REAL SPACE TO CORRECT A FIRST IMAGE BASED ON POSITIONS OF AT LEAST TWO IDENTIFIED LINES IN THE FIRST IMAGE, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Ritsuko Otake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 17/548,017

(22) Filed: Dec. 10, 2021

(65) Prior Publication Data
US 2022/0188992 A1   Jun. 16, 2022

(30) Foreign Application Priority Data
Dec. 16, 2020   (JP) .................................. 2020-208266

(51) Int. Cl.
| | |
|---|---|
| G06T 5/00 | (2024.01) |
| G06T 5/50 | (2006.01) |
| G06T 5/80 | (2024.01) |
| G06T 7/543 | (2017.01) |
| G06T 7/70 | (2017.01) |
| G03G 15/00 | (2006.01) |
| H04N 1/387 | (2006.01) |

(52) U.S. Cl.
CPC .................. *G06T 5/80* (2024.01); *G06T 5/50* (2013.01); *G06T 7/543* (2017.01); *G06T 7/70* (2017.01); *G03G 15/6567* (2013.01); *H04N 1/387* (2013.01); *H04N 1/3872* (2013.01); *H04N 1/3877* (2013.01); *H04N 1/3878* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,065,261 B1* | 6/2006 | Horie .................. | H04N 5/2628 382/296 |
| 2010/0053325 A1* | 3/2010 | Inagaki ..................... | G06T 3/18 382/282 |
| 2015/0279017 A1* | 10/2015 | Tamura ..................... | G06T 7/85 382/103 |
| 2016/0217340 A1* | 7/2016 | Miyauchi ............. | H04N 5/2628 |
| 2018/0220020 A1* | 8/2018 | Yoshida ............. | H04N 1/00748 |
| 2020/0288040 A1* | 9/2020 | Tsuda ................. | G06V 30/1463 |

FOREIGN PATENT DOCUMENTS

| | | |
|---|---|---|
| JP | 2013110712 A | 6/2013 |
| JP | 2015165629 A | 9/2015 |
| JP | 2017225090 A | 12/2017 |
| JP | 2019125076 A | 7/2019 |

\* cited by examiner

*Primary Examiner* — Haris Sabah
(74) *Attorney, Agent, or Firm* — Canon U.S.A., Inc. IP Division

(57) ABSTRACT

An image processing apparatus includes an identification unit configured to identify, in a first image, a line corresponding to a vertical line in a real space, and a correction unit configured to correct the first image to be a second image based on respective positions of at least two lines identified in the first image.

15 Claims, 10 Drawing Sheets

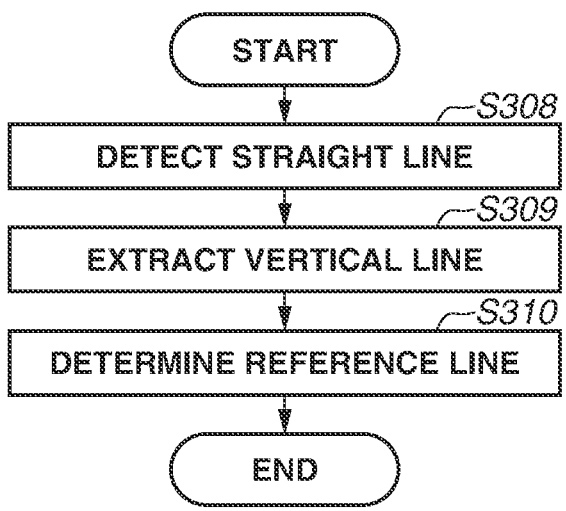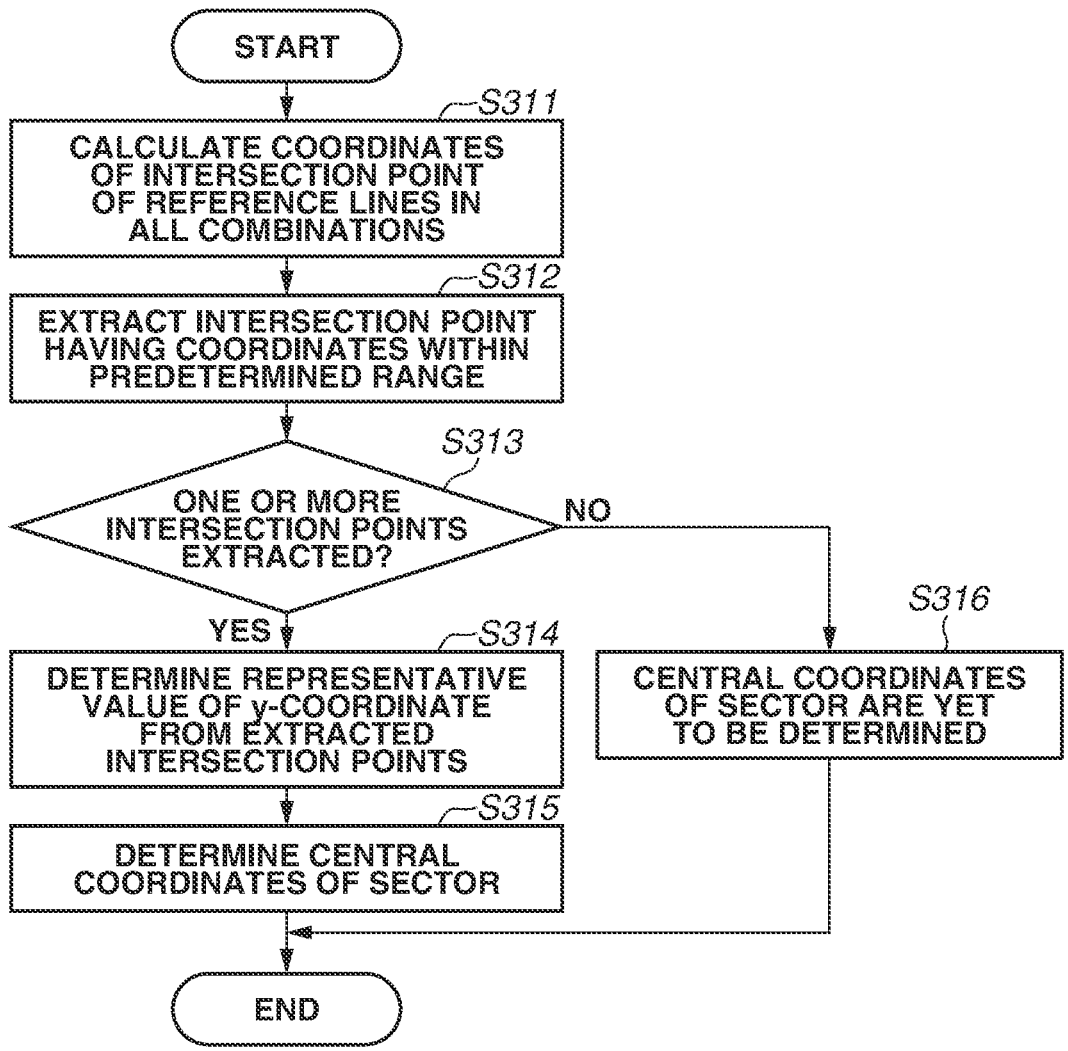

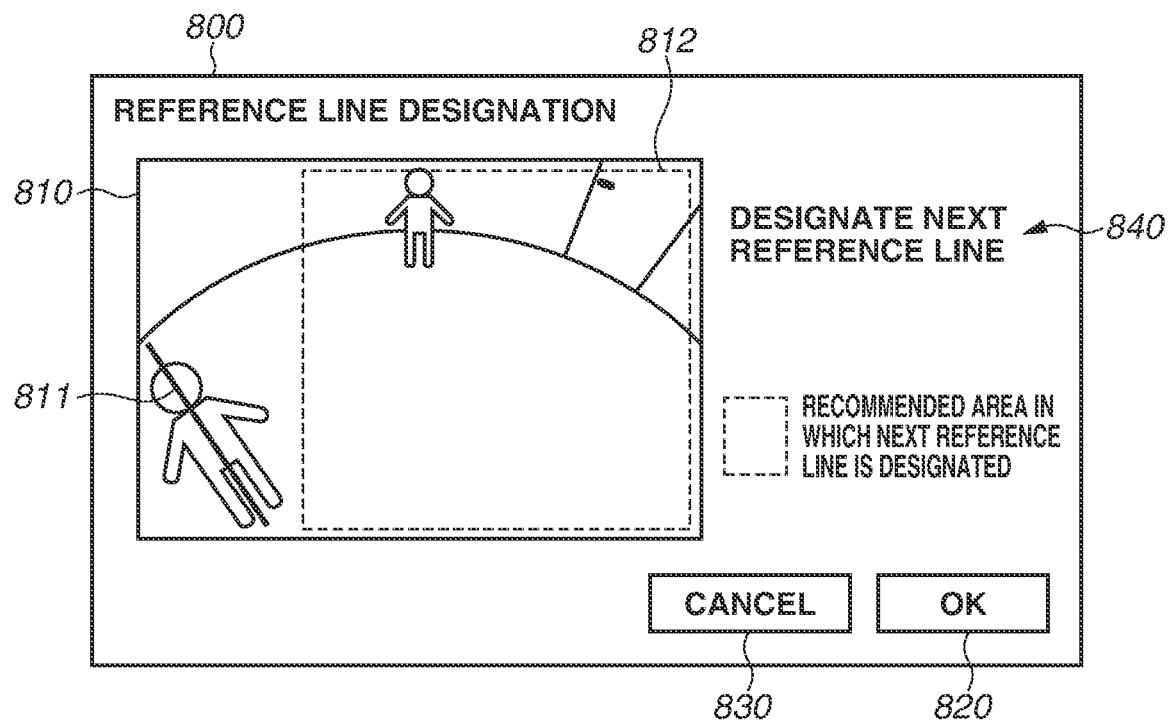
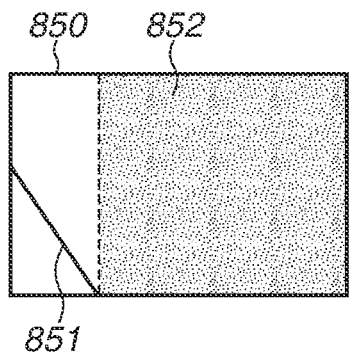 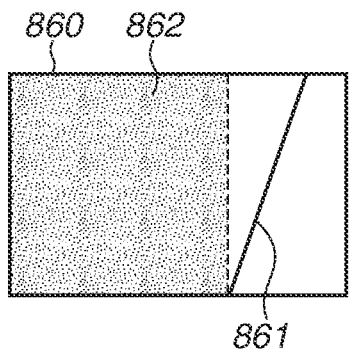 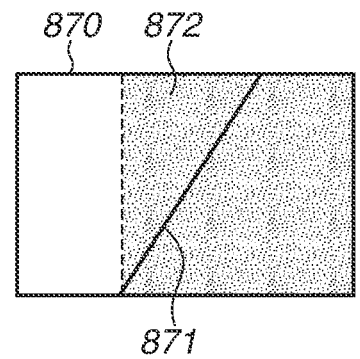

IMAGE PROCESSING APPARATUS IDENTIFIES A LINE IN A REAL SPACE TO CORRECT A FIRST IMAGE BASED ON POSITIONS OF AT LEAST TWO IDENTIFIED LINES IN THE FIRST IMAGE, IMAGE PROCESSING METHOD, AND NON-TRANSITORY COMPUTER-READABLE STORAGE MEDIUM

BACKGROUND

Field of the Disclosure

The present disclosure relates to an image processing technique for processing a captured image.

Description of the Related Art

A technique of correcting distortion of an image captured with a wide-angle lens has been conventionally known. Japanese Patent Application Laid-Open No. 2015-165629 discusses a technique of detecting a rectangular region of a subject from a captured image, calculating a distortion rate of the detected region, and deriving a transformation parameter to correct the distortion caused by the wide-angle lens based on the distortion rate. Japanese Patent Application Laid-Open No. 2013-110712 discusses a technique of, when an image captured by a vehicle-mounted camera is displayed on a monitor inside a vehicle, switching a correction coefficient in accordance with a position on the captured image and performing distortion correction to reduce lens distortion while maintaining wide-range display.

SUMMARY

According to embodiments of the present disclosure, an image processing apparatus includes an identification unit configured to identify, in a first image, a line corresponding to a vertical line in a real space, and a correction unit configured to correct the first image to be a second image based on respective positions of at least two lines identified in the first image.

Further features of the present disclosure will become apparent from the following description of exemplary embodiments with reference to the attached drawings.

BRIEF DESCRIPTION OF THE DRAWINGS

FIGS. 3A to 3C are flowcharts of image processing according to an exemplary embodiment.

FIGS. 8A to 8D are diagrams each illustrating an example of an operation screen that prompts addition of a reference line.

DESCRIPTION OF THE EMBODIMENTS

Figure 1:
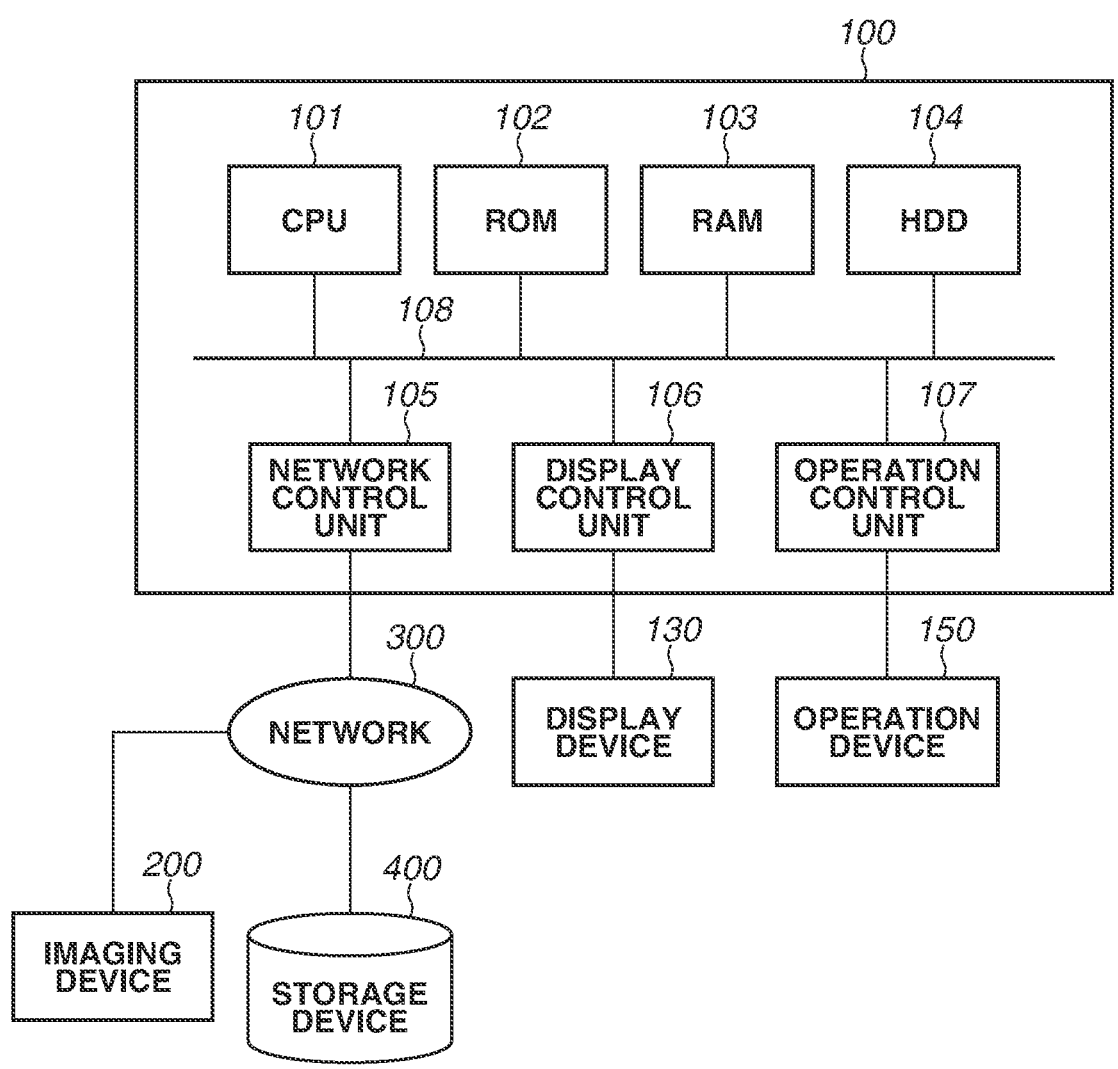
FIG. 1 is a diagram illustrating a configuration example of a system including an image processing apparatus.

Exemplary embodiments of the present disclosure will be described below with reference to the accompanying drawings. The following exemplary embodiments do not limit the present disclosure, and all combinations of features described in the exemplary embodiments are not necessarily essential. The same constituent elements are denoted by the same reference numerals and descriptions thereof will be omitted.

A first exemplary embodiment is described below. FIG. 1 is a diagram illustrating a schematic configuration example of a system including an image processing apparatus according to the present exemplary embodiment.

An image processing apparatus 100 includes a central processing unit (CPU) 101, a read-only memory (ROM) 102, a random-access memory (RAM) 103, a hard disk drive (HDD) 104, a network control unit 105, a display control unit 106, and an operation control unit 107. These constituent units are connected to each other via a system bus 108, and capable of transmitting/receiving data therebetween. The image processing apparatus 100 is connected to a network 300 via the network control unit 105, and connected to an imaging device 200 and a storage device 400 via the network 300. In addition, the image processing apparatus 100 is connected to a display device 130 via the display control unit 106. Furthermore, the image processing apparatus 100 is connected to an operation device 150 via the operation control unit 107.

The CPU 101 performs overall control of operations of the image processing apparatus 100, and performs control of each of the constituent units (102 to 107) via the system bus 108. Additionally, the CPU 101 executes image processing, image analysis processing, and the like according to the present exemplary embodiment, which will be described below, based on a program.

The ROM 102 is a non-volatile memory that stores a control program for execution of processing by the CPU 101. The HDD 104 is a high-capacity storage device. The HDD 104 stores an operating system (OS), a program for execution of the image processing and the image analysis processing according to the present exemplary embodiment by the CPU 101, and various kinds of data such as data utilized for the image analysis processing and analysis result data. The program may be stored in, besides the HDD 104, an external memory or a detachably mounted storage medium, which is not illustrated. The RAM 103 functions as a main memory and a work area of the CPU 101. That is, the CPU 101 loads a necessary program from the ROM 102 or the HDD 104 into the RAM 103 when executing processing, and executes the program to implement various kinds of functional operations.

The network control unit 105 is an interface for performing communication with an external device via the network 300. The external device is the imaging device 200 such as a network camera, the storage device 400 for accumulating video recording data and other data, or a device connected to the network.

The display control unit 106 is an interface for causing the display device 130 to display data output from the image processing apparatus 100.

The operation control unit 107 is an interface for transmitting operation instruction information input by a user via the operation device 150 to the image processing apparatus 100. The operation device 150 is, for example, a keyboard, a mouse, or a touch panel. In a case where the operation device 150 is a touch panel, the touch panel may be integrated with a screen of the display device 130.

In the configuration described above, when the image processing apparatus 100 is powered ON, the CPU 101 executes a boot program stored in the ROM 102, loads the OS from the HDD 104 into the RAM 103, and executes the OS. Under control of the OS loaded to the RAM 103, the CPU 101 loads an image processing application program according to the present exemplary embodiment from the HDD 104 to the RAM 103, and executes the image processing application program. In addition, the CPU 101 loads an image analysis processing application program from the HDD 104 into the RAM 103, and executes the image analysis processing application program. With this configuration, the image processing apparatus 100 according to the present exemplary embodiment also functions as an image analysis apparatus.

Figure 2A:
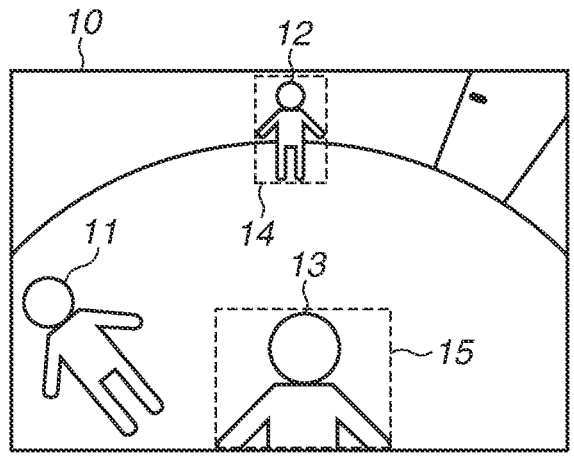
FIGS. 2A to 2C are diagrams illustrating a relationship between image analysis processing for detecting a human figure and distortion of an image.

FIG. 2A is a diagram illustrating a captured image using the wide-angle lens, and a relationship between distortion of the captured image and a subject captured in the image in a case where image analysis processing for detecting a human figure and estimating the number of people from the captured image is performed. FIG. 2A illustrates an example of a result of performing the image analysis processing for detecting a human figure that is the subject on an image 10 captured with the wide-angle lens without performing the image processing according to the present exemplary embodiment.

In the example illustrated in FIG. 2A, a human figure 12 surrounded by a broken line 14 and a human figure 13 surrounded by a broken line 15 indicate human figures detected as a result of image analysis. In a case of the example of the image 10, three human figures, i.e., human figures 11 to 13, are actually captured, but only two of the three, i.e., the human figures 12 and 13, are detected by the image analysis processing, and the human figure 11 is not detected. The human figures 12 and 13 are seen in a state of standing upright in a vertical direction of the captured image, and hence are detected as human figures by the image analysis processing. In contrast, the human figure 11 is seen in an oblique state, and hence cannot be detected as a human figure by the image analysis processing. That is, in the case of the image 10 illustrated in FIG. 2A, the human figure 11 in the oblique state cannot be detected, resulting in low analysis accuracy in the image analysis processing. In a case where an omission of detecting a human figure occurs in this manner, analysis accuracy in the image analysis processing for estimating the number of people also becomes low.

Figure 2B:
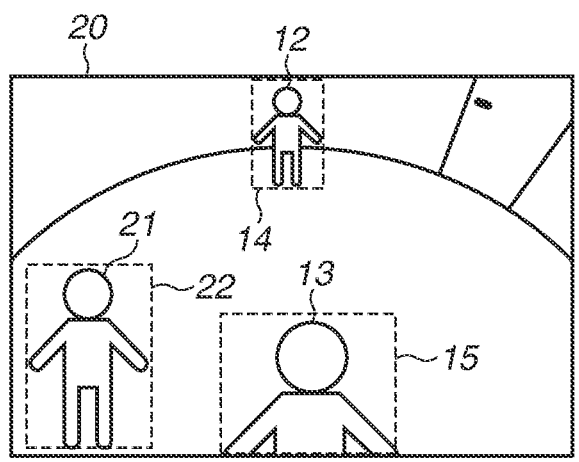

FIG. 2B illustrates a result of performing the image analysis processing similarly to that described above on an image 20 that has undergone image processing in which only the oblique human figure 11 in the image 10 exemplified in FIG. 2A is rotated to serve as a human figure 21. The rotated human figure 21 is in a state of standing upright in the vertical direction in the image 20, and hence can be detected as a human figure in the image analysis processing. In the example illustrated in FIG. 2B, the human figure 21 is thus drawn as a human figure surrounded by a broken line 22 indicating that the human figure is detected as a result of the image analysis. In this manner, in a case where the human figure is seen obliquely in the image captured with the wide-angle lens, changing an angle of the human figure on the image so that the human figure becomes in the state of standing upright in the vertical direction enables the human figure to be detected as a human figure in the image analysis processing. However, in a case of the image processing of rotating only the oblique human figure in the image 10 to generate the image 20, processing for determining a region to be rotated is highly complicated. Thus, it is not realistic to perform the processing as pre-processing before the image analysis.

To address this, in the present exemplary embodiment, the image processing apparatus 100 performs, as the image processing, identification processing of identifying a line corresponding to a vertical line in a real space on a first image captured with the wide-angle lens, and correction processing of correcting the first image to a second image based on positions of at least two lines identified on the first image. In the correction processing, the image processing apparatus 100 generates a transformation coefficient for performing simple geometric transformation of the first image based on at least two lines acquired by the identification processing, so that the subject, which is actually oriented in the vertical direction in the real space but is seen obliquely on the first image, is corrected to be oriented in the vertical direction. The image processing apparatus 100 performs geometric transformation processing using the transformation coefficient on the first image so that the orientation of the subject such as a human figure is corrected to approach a perpendicular direction (vertical direction) of the image, thereby acquiring the second image. This can prevent reduction in accuracy of the image analysis due to influence of inclination of the subject in the image. That is, for example, even in a case where a human figure or the like is seen obliquely in the image captured with the wide-angle lens, the configuration can prevent reduction in accuracy of analysis for detecting the human figure or the like or estimating the number of subjects.

Figure 2C:
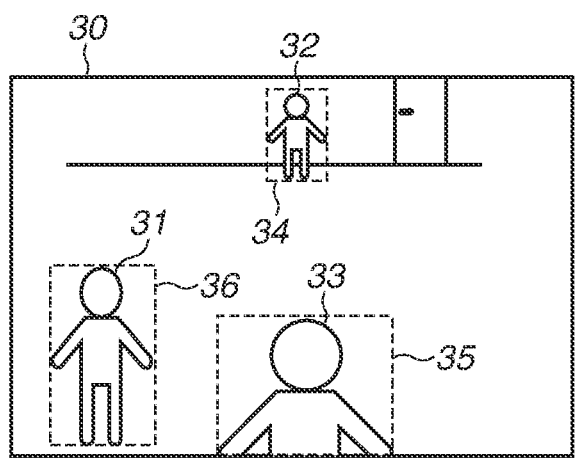

An image 30 illustrated in FIG. 2C is an image (second image) obtained by performing the image processing according to the present exemplary embodiment (correction processing by simple geometric transformation) on the image 10 (first image) illustrated in FIG. 2A, and indicates a result of performing the image analysis processing to detect a human figure from the corrected image. In FIG. 2C, a human figure 32 corresponds to the human figure 12 illustrated in FIG. 2A. Similarly, a human figure 33 corresponds to the human figure 13, and a human figure 31 corresponds to the human figure 11. In a case of FIG. 2C, especially the human figure 31, among the human figures 31 to 33 in the image 30, is deformed to some extent in comparison with the human figure 13 in the original image 10 illustrated in FIG. 2A, but is in a state of standing upright in the vertical direction in the image 30. Hence, in the image 30 illustrated in FIG. 2C, not only the human figures 32 and 33 but also the human figure 31 are detected as human figures by the image analysis processing. That is, in the case of FIG. 2C, the human figures 32 and 33 are surrounded by broken lines 34 and 35, respectively, and the human figure 31 is also surrounded by a broken line 36 indicating that the human figure 31 is detected as a human figure by the image analysis.

A description will be given of the image processing (geometric transformation processing) that is performed by the image processing apparatus 100 according to the present exemplary embodiment as pre-processing of the image analysis processing.

Figure 3A:
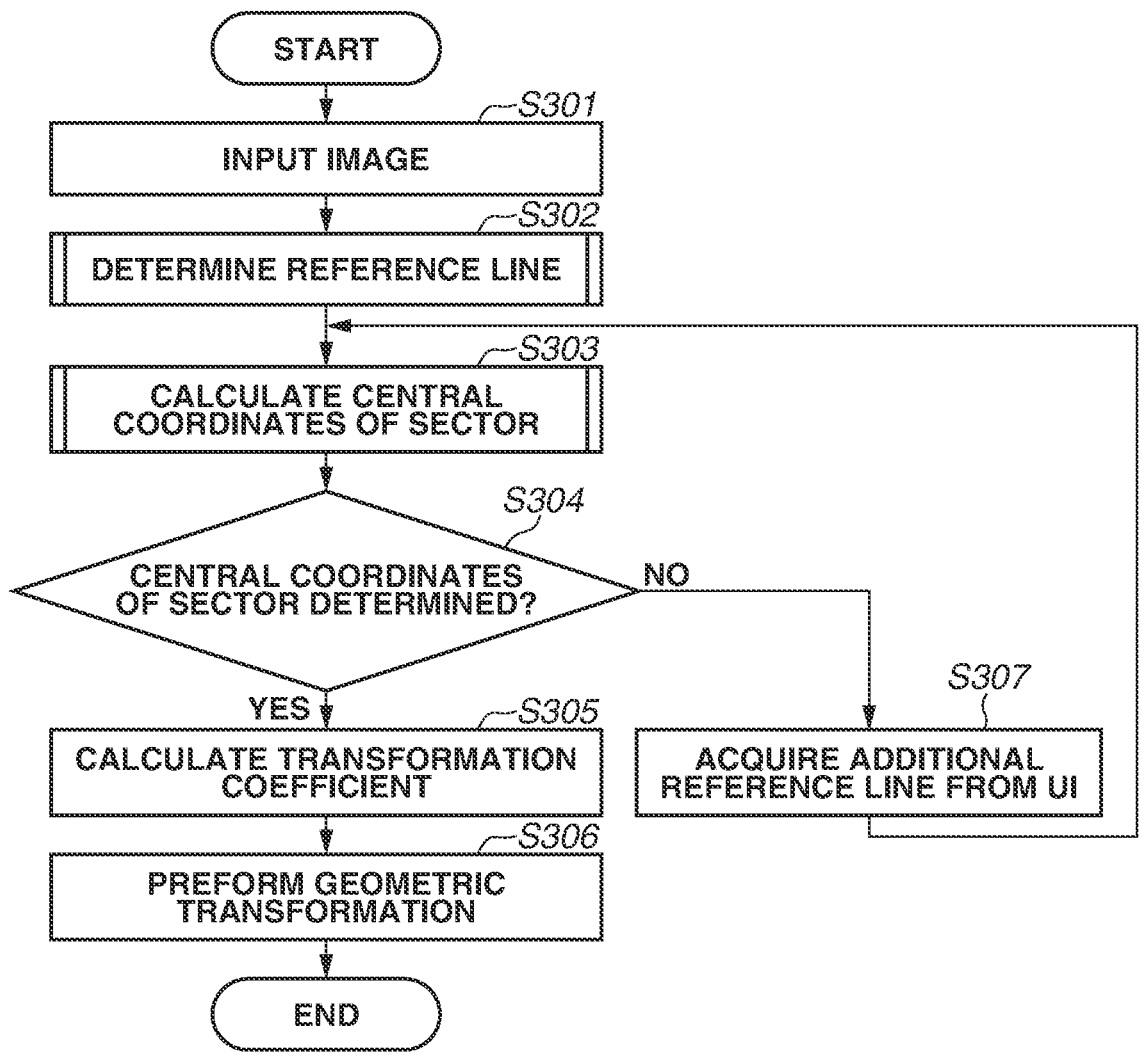

FIGS. 3A to 3C are flowcharts each describing the flow of the image processing (geometric transformation processing) executed by the image processing apparatus 100 according to the present exemplary embodiment on the first image acquired from the imaging device 200, such as a network camera, or the storage device 400 via the network 300. Each processing in each of the following flowcharts is implemented by the CPU 101 of the image processing apparatus 100 executing a program according to the present exemplary embodiment.

In step S301, the CPU 101 accepts input of a target image to be processed. Assume that the target image to be processed is the image (first image) captured using the wide-angle lens.

Subsequently, in step S302, the CPU 101 identifies, on the input image accepted in step S301, a reference line that is a straight line estimated to indicate the vertical direction of the subject in the real space and that is used at the time of calculating a transformation coefficient thereafter.

FIG. 3B is a flowchart illustrating details of reference line determination processing performed in step S302.

In step S308 in FIG. 3B, the CPU 101 detects a straight line in the image.

As a method of detecting the straight line, any of various kinds of commonly known methods may be used.

As an example, the CPU 101 performs grayscale transformation on the input image, and extracts edge pixels as elements of an edge by utilizing differential information of each pixel value. Subsequently, the CPU 101 virtually defines a plurality of straight lines at various positions and angles, and performs Hough transformation to select a straight line on which many of the extracted edge pixels are placed. At this time, even if the subject is a straight line, it may be distorted on the captured image due to distortion of a lens. For this reason, assume that a permissible amount for determining that the edge pixels are placed on the virtually defined straight line is set depending on an image-capturing condition. At this time, it is desirable to eliminate an unnecessary straight line from a group of selected straight lines.

For example, the CPU 101 cancels selection of a straight line that edge pixels exist only in a very narrow range thereof, that is, a very short straight line.

In step S309, the CPU 101 extracts, from among the group of straight lines detected in step S308, a straight line that satisfies a predetermined condition under which the straight line can be estimated to be a vertical line in the real space. The predetermined condition under which the straight line can be estimated to be the vertical line is defined assuming that the input image is an image captured with the wide-angle lens. That is, a straight line having an angle with a straight line drawn from the upper right to the lower left is extracted as the vertical line of the subject on the right side with respect to the center of the image, and a straight line having an angle with a straight line drawn from the upper left to the lower right is extracted as the vertical line of the subject on the left side with respect to the center of the image. If a range of angles at which a straight line is determined as the vertical line is defined depending on the position of the subject in the image in consideration of an image capturing condition, the image analysis accuracy can be further increased.

In step S310, the CPU 101 identifies, from among the straight lines estimated as the vertical lines in the real space, a straight line utilized for calculating a coefficient of geometric transformation, which will be performed thereafter, and determines the straight line as a reference line. At this time, in a case where the number of straight lines estimated as the vertical lines in the real space is less than a predetermined number (for example, two), the CPU 101 sets all the straight lines as reference lines. On the other hand, in a case where the number of straight lines estimated as the vertical lines in the real space is the predetermined number or more, the CPU 101 selects, if there is a plurality of straight lines of which the angles and positions are close to the screen, one representative straight line of the plurality of straight lines, and sets the representative straight line as the reference line. Examples of the straight lines of which the angles and positions are close to the screen can include straight lines of which the angles are within a threshold angle range or of which the positions are within a threshold position range. The CPU 101 eliminates a singular straight line that can be determined as noise from candidates for reference lines. For example, in such a case where one straight line is obviously different in direction (angle) from many of surrounding straight lines, the CPU 101 determines the straight line as the singular straight line, and eliminates the straight line from the candidates for the reference lines. The CPU 101 may also determine whether the straight line is obviously different from the surrounding straight lines based on, for example, the threshold angle range. In this manner, the CPU 101 determines, from the input image (first image), at least two or more (equal to or more than two) reference lines corresponding to vertical lines in the real space and having different angles in the image.

After the processing in step S310 in FIG. 3B, that is, after the processing in step S302 in FIG. 3A, the processing proceeds to step S303 in FIG. 3A.

In step S303, the CPU 101 sets a sector region including the captured image (first image) as a virtual planar region before geometric transformation, based on the two or more reference lines having different angles in the image, which are determined in step S302. The CPU 101 then calculates central coordinates of the sector region (coordinates corresponding to the pivot of the sector). Details of setting of the sector region based on the two or more reference lines having different angles in the image and the central coordinates of the sector region will be described below.

FIG. 3C is a detailed flowchart of the processing in step S303 for setting the sector region based on the two or more reference lines having different angles in the image and calculating central coordinates of the sector region.

In step S311 in FIG. 3C, the CPU 101 calculates, in all combinations of the two or more reference lines having different angles, which are determined in step S302, coordinates of an intersection point of extension lines of the reference lines.

Subsequently, in step S312, the CPU 101 extracts, from among intersection points calculated in step S311, an intersection point of which the coordinates are within a predetermined range. In a case where only one intersection point is calculated in step S311, the CPU 101 extracts the intersection point. On the other hand, in a case where a plurality of intersection points is calculated in step S311, the CPU 101 extracts, from among the plurality of intersection points, an intersection point of which the coordinates are within the predetermined range. The predetermined range mentioned herein is a range of a predetermined width centering on either the center of a horizontal width of the image or the center of a longitudinal width of the image. For example, assuming that a direction of the horizontal width of the image is an x-axis direction and a direction of the longitudinal width of the image is a y-axis direction (an axis orthogonal to the x-axis direction), the predetermined range is a range between two straight lines that each have a predetermined distance in the x-axis direction from a straight line extending in the y-axis and passing through the center of the horizontal width of the image and that are both in parallel with the y-axis. In this case, the CPU 101 extracts an intersection point of which the x-coordinate is within the predetermined range. While the description has been given of the predetermined range using an example in which the distance from the vertical line in the y-axis direction, which passes through the center of the horizontal width of the image, is within the predetermined distance, the predetermined range may be a range of a predetermined distance from the vertical line in the x-axis direction which passes through the center of the longitudinal width of the image. Alternatively, the CPU 101 may set the predetermined range by switching between the predetermined range in which the distance from the vertical line passing through the center of the horizontal width of the image is within the predetermined distance and the predetermined range in which the distance from the vertical line passing through the center of the longitudinal width of the image, depending on the image capturing condition as appropriate.

Subsequently, in step S313, the CPU 101 determines presence/absence of the intersection point extracted in step S312. In a case where there is no extracted intersection point (NO in step S313), the processing proceeds to step S316. In step S316, the CPU 101 generates information indicating that the central coordinates of the sector region are not yet determined. On the other hand, in a case where there are one or more extracted intersection points (YES in step S313), the processing proceeds to step S314.

In step S314, the CPU 101 determines a representative value of a y-coordinate based on the coordinates of the extracted intersection points. The CPU 101 sets an average value or median value of y-coordinates of all the extracted intersection points as the representative value. A method of determining the representative value of the y-coordinate is not specifically limited. The CPU 101, for example, may calculate a y-coordinate in the vicinity of a location where many intersection points are concentrated, based on distribution of the y-coordinates of all of the intersection points, and set this y-coordinate as the representative value.

In step S315, the CPU 101 determines the central coordinates of the sector region. In the present exemplary embodiment, the CPU 101 sets the representative value of the y-coordinate calculated in step S314 as the y-coordinate of the central coordinates of the sector region. The CPU 101 sets an x-coordinate corresponding to the center in the horizontal width direction of the image as an x-coordinate of the central coordinates of the sector region. The CPU 101 then generates information indicating the central coordinates of the sector region are determined. In this manner, the processing of calculating the central coordinates of the sector region is performed.

After the processing of the flowchart in FIG. 3C, that is, after the processing in step S303 in FIG. 3A, the processing proceeds to step S304 in FIG. 3A.

In step S304, the CPU 101 determines whether the central coordinates of the sector region are determined. In a case where the central coordinates of the sector region are determined (YES in step S304), the processing proceeds to step S305. In a case where the central coordinates of the sector region are not determined (NO in step S304), the processing proceeds to step S307.

In step S305, the CPU 101 calculates a transformation coefficient to be used for geometric transformation for correcting the first image to the second image. At this time, the CPU 101 defines planar regions before and after the geometric transformation, and generates information for performing mapping of coordinates. The CPU 101 determines a size of the second image based on the sector region and the first image, and performs mapping processing to perform coordinate transformation from the sector region to the second image so as to match the determined size. The calculation of the transformation coefficient may be performed when the central coordinates of the sector is determined.

Then in step S306, the CPU 101 executes coordinate transformation by the mapping processing utilizing the transformation coefficient calculated in step S305, and thereby preforms geometric transformation on the first image to correct the first image to the second image.

FIGS. 4A to 4D are diagrams illustrating a concept of processing from calculation of the central coordinates of the sector to the geometric transformation, and a concept of processing until the second image in which the oblique line in the first image is corrected to the vertical line is obtained by the geometric transformation.

Figure 4A:
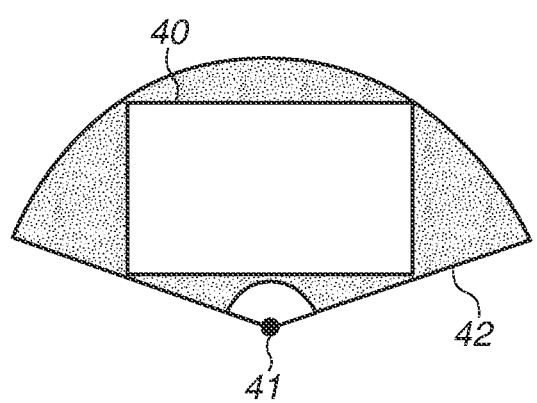
FIGS. 4A to 4D are diagrams illustrating a planer region including an image before and after transformation.

FIG. 4A is a diagram illustrating a relationship between the input image serving as the first image and the sector. The input image is illustrated as an original image region 40 in FIG. 4A. A sector region 42 is a region in a sector form circumscribing the original image region 40, and coordinates at a position corresponding to the pivot of the sector are central coordinates 41. That is, in step S303 described above, the central coordinates 41 illustrated in FIG. 4A are calculated as the central coordinates of the sector.

Figure 4B:
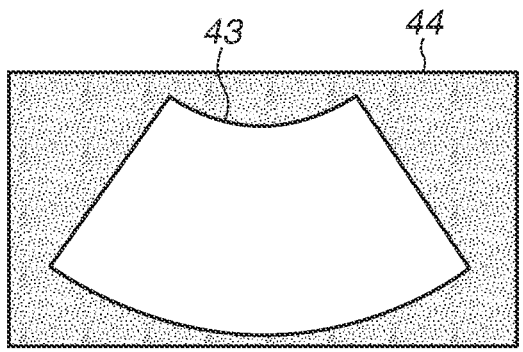

FIG. 4B is a diagram illustrating a planar region obtained after the geometric transformation is performed on the planar region, which is composed of the original image region and the sector region. In the present exemplary embodiment, the geometric transformation is performed to transform the sector region 42 illustrated in FIG. 4A to a rectangular region. A transformed rectangular region 44 is a rectangular region obtained by performing the geometric transformation on the sector region 42. A transformed image region 43 is a region obtained by performing the geometric transformation on the original image region 40. A size and shape (aspect ratio) of the transformed rectangular region 44 may be identical to those of the original image region 40, or may be adjusted in accordance with an image capturing condition and a resolution necessary for subsequent analysis processing. For example, as a center angle of the sector region 42 becomes larger, a rate at which a size of an arc portion of the sector is relatively reduced by the geometric transformation increases. Thus, to secure the resolution necessary for the analysis processing, for example, the size of the transformed rectangular region 44 is adjusted to a size larger than that of the original image region 40.

Mapping from the sector region 42 to a rectangular region, i.e., the transformed rectangular region 44, is performed by determination of coordinates, in the sector region 42, corresponding to coordinates defined at a predetermined interval in the transformed rectangular region 44. The coordinates in the sector region 42 may be determined to have a predetermined interval with respect to the central angle and a radius of the arc with reference to the central coordinates 41, but an interval in a radius direction may be changed in accordance with a depth of the subject depending on an image capturing condition.

Figure 4C:
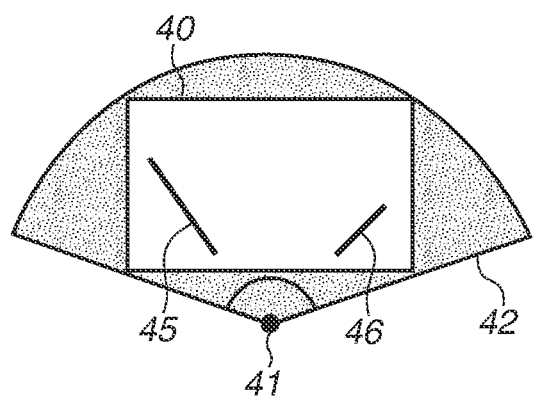
Figure 4D:
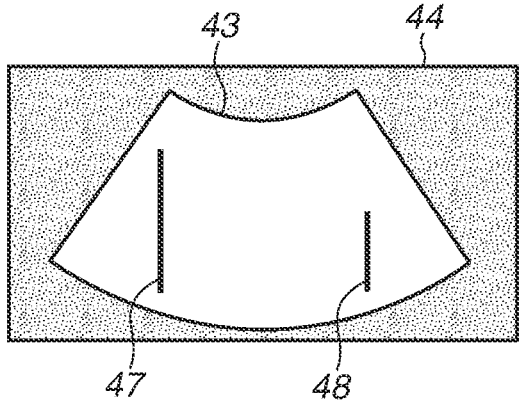

Performing such geometric transformation corrects the straight lines 45 and 46 corresponding to respective vertical lines in the real space in the sector region 42 illustrated in FIG. 4C are corrected to be approximately vertical straight lines 47 and 48, respectively, in the transformed rectangular region 44 illustrated in FIG. 4D.

The description will return to the flowchart in FIG. 3A.

In a case where the central coordinates of the sector is not determined in step S304, the processing proceeds to step S307. In step S307, the CPU 101 acquires information on an additional reference line input by the user via a user interface (UI). The additional reference line is given by the user's input in the present exemplary embodiment, but a method thereof is not specifically limited. For example, the user may directly input coordinate information on a start point and end point in the original image, the CPU 101 may acquire information on a line identified by the coordinate information on the start point and the end point, as information indicating the additional reference line. For another example, the original image may be displayed on the display device 130 to prompt the user to designate a corresponding portion on the image via the operation device 150, and the CPU 101 may perform transformation processing to obtain coordinate information on the additional reference line based on the information on the designated portion. If the CPU 101 can acquire reference lines sufficient for determining the central coordinates of the sector by the processing in step S307, the processing can proceed to step S305 and subsequent steps.

The image processing apparatus 100 according to the first exemplary embodiment defines two or more reference lines estimated to extend in the vertical direction in the real space on the first image captured with the wide-angle lens, performs the correction processing to perform the geometric transformation on the first image based on these reference lines, and acquires the second image. With this processing, the image processing apparatus 100 according to the present exemplary embodiment can acquire an image appropriate for an input for the image analysis processing.

In the first exemplary embodiment, the description has been given of the example of performing the geometric transformation so that a distorted image captured with the wide-angle lens becomes to have characteristics appropriate for the analysis processing. In a second exemplary embodiment, a description will be given of an operation screen for the user to directly designate a reference line for calculating a transformation coefficient (correction coefficient) used for geometric transformation, and processing of displaying the operation screen.

Figure 5:
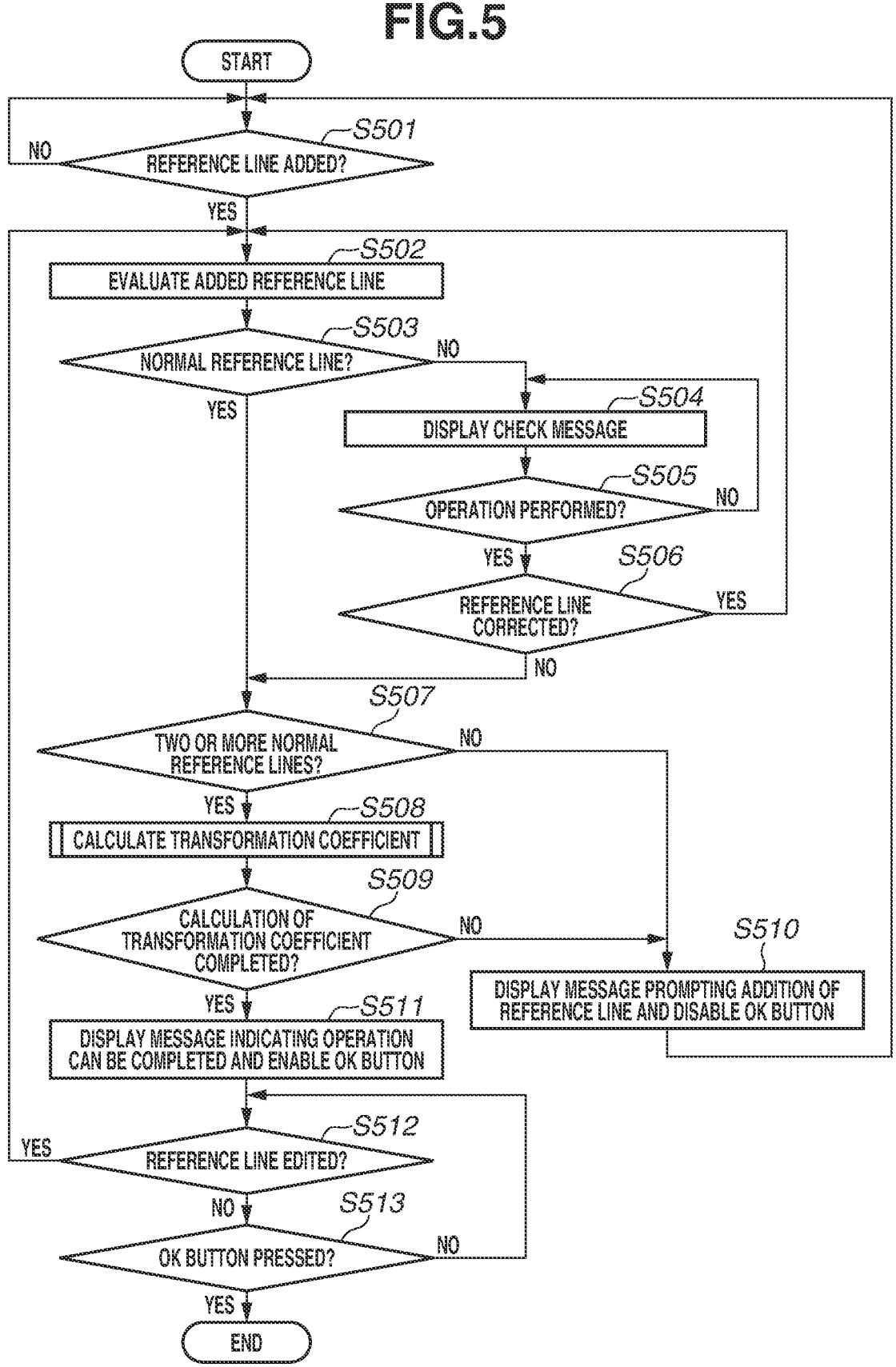
FIG. 5 is a flowchart of processing regarding designation of reference lines by a user.

FIG. 5 is a flowchart of processing related to the operation screen for the user to designate the reference line.

In step S501, the CPU 101 monitors whether a reference line addition operation is performed by the user, based on information input from the operation device 150 via the operation control unit 107. In a case where the reference line addition operation is performed by the user (YES in step S501), the processing proceeds to step S502. In step S502, the CPU 101 evaluates a reference line added by the user. In the following description, the reference line added by the user is referred to as an additional reference line.

Figure 6:
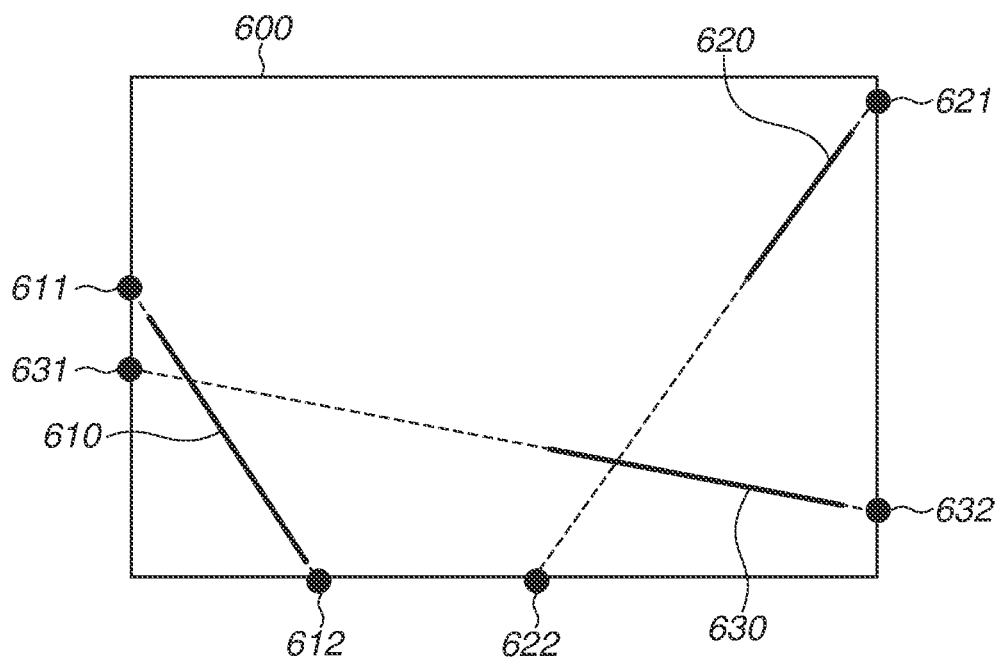
FIG. 6 is a diagram illustrating evaluation of the reference lines.

FIG. 6 is a diagram illustrating the processing of evaluating the additional reference line in step S502.

In FIG. 6, reference lines 610, 620, and 630 indicated by thick lines represent additional reference lines designated by the user. Broken lines illustrated in FIG. 6 indicate respective extension lines of the additional reference lines 610, 620, and 630 designated by the user. Furthermore, FIG. 6 illustrates intersection points 611, 612, 621, 622, 631, and 632 where the respective extension lines of the reference lines 610, 620, and 630 intersect with sides of an image 600. For example, the extension line of the additional reference line 610 intersects with the sides of the image 600 at the intersection points 611 and 612.

Since the reference line in the present exemplary embodiment mentioned herein is a line corresponding to the vertical direction in the real space, one intersection point of the two intersection points where the extension line of the reference line intersects with the sides of the captured image is to intersect with a predetermined side of the captured image. For example, in a case where a lateral direction of the image 600 corresponds to a horizontal direction in the real space, one intersection point of intersection points where the extension line of each reference line intersects with the sides of the image is to intersect with a lower side of the image 600.

In a case of an example illustrated in FIG. 6, the extension line of the additional reference line 610 intersects with the lower side of the image 600 at the intersection point 612, and the extension line of the additional reference line 620 intersects with the lower side of the image 600 at the intersection point 622. Hence, the additional reference lines 610 and 620 can be determined as lines representing the vertical direction of the subject in the real space. In the present exemplary embodiment, among the additional reference lines designated by the user, a reference line that can be determined as a line representing the vertical direction of the subject is referred to as a normal reference line. On the other hand, the extension line of the additional reference line 630 intersects with the sides of the image 600 at the intersection points 631 and 632, but neither the intersection point 631 nor the intersection point 632 is a point on the lower side of the image 600. That is, since the extension line of the additional reference line 630 does not intersect with the lower side of the image 600, the additional reference line 630 is not the normal reference line corresponding to the vertical direction of the subject in the real space, and can be determined as a line inappropriate for the reference line (that is, an abnormal reference line).

In this manner, in step S502, the CPU 101 determines whether the additional reference line intersects with the predetermined side (the lower side in the example in FIG. 6) of the image, and thereby evaluates whether the additional reference line is the normal reference line. That is, in the case of the example in FIG. 6, the CPU 101 evaluates, among the additional reference lines 610, 620, and 630, the additional reference lines 610 and 620 to be the normal reference lines, and evaluates the additional reference line 630 not to be the normal reference line (i.e., evaluates the additional reference line 630 to be the abnormal reference line).

In step S503, the CPU 101 determines whether all the additional reference lines are evaluated as the normal reference lines in the evaluation in step S502. In other words, the CPU 101 determines whether there is any additional reference line that is evaluated not to be the normal reference line in the evaluation processing in step S502. In a case where the CPU 101 evaluates all the additional reference lines to be the normal reference lines (YES in step S503), the processing proceeds to step S507. On the other hand, in a case where there is any additional reference line that is evaluated not to be the normal reference line (NO in step S503), the processing proceeds to step S504.

In the case of the example in FIG. 6, since the additional reference line 630 is evaluated not to be the normal reference line, the processing proceeds to step S504.

In step S504, the CPU 101 controls the display control unit 106 to display a message that prompts checking on the operation screen of the display device 130.

Figure 7:
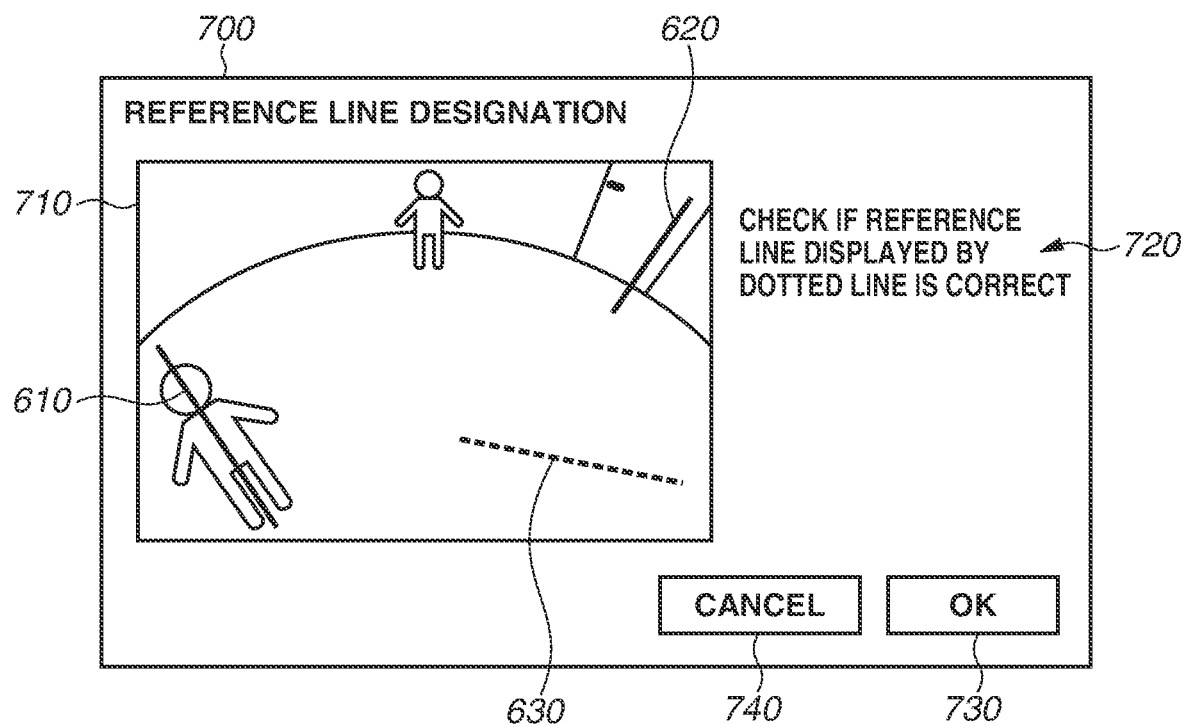
FIG. 7 is a diagram illustrating an example of an operation screen that prompts checking of a reference line.

FIG. 7 is a diagram illustrating an example of the operation screen on which the message for checking is displayed.

As illustrated in FIG. 7, an image display region 710, an OK button 730, a cancel button 740, and a message 720 are arranged on a screen 700 of the display device 130. The captured image is displayed in the image display region 710, and the additional reference lines 610, 620, and 630 designated by the user are displayed on the image. The message 720 is a text message of which the content is to prompt the user to check the additional reference line evaluated not to be the normal reference line. At this time, the additional reference line, which is a target to be checked by the user, is displayed differently from the other normal reference lines to clearly demonstrate that the target additional reference line is a reference line that needs to be checked by the user. In the example illustrated in FIG. 7, the additional reference lines 610 and 620 evaluated to be the normal reference lines are displayed by, for example, solid lines, while the additional reference line 630 evaluated not to be the normal reference line is displayed by, for example, a dotted line. A method of displaying the additional reference line serving as the target to be checked by the user is not limited to the method using a dotted line, and may be any methods that enable discrimination of the target additional reference line to be checked by the user from the normal reference lines, such as a method of displaying the target additional reference line in a different display color from the normal reference lines and a method of blinking the target additional reference line. Displaying the operation screen as illustrated in FIG. 7 allows the user to perform an operation such as correction and change on the additional reference line serving as the target to be checked, or to perform an operation to check the additional reference line and not to correct the additional reference line.

In step S505, the CPU 101 monitors information input from the operation device 150 via the operation control unit 107, and stands by until a user operation is performed on the operation screen for checking the reference line as illustrated in FIG. 7. In a case where no user operation is performed (NO in step S505), the processing returns to step S504. In a case where a user operation is performed (YES in step S505), the processing proceeds to step S506.

In step S506, the CPU 101 determines whether an operation of correcting the reference line is performed by the user from the operation device 150 via the operation control unit 107. In a case where the operation of correcting the reference line is performed (YES in step S506), the processing returns to step S502. In step S502, the CPU 101 performs the processing of evaluating the reference line corrected by the user. On the other hand, in a case where no operation of correcting the reference line is performed by the user (NO in step S506), i.e., the user checks the reference line and performs an operation to advance the process, the processing proceeds to step S507.

In step S507, the CPU 101 determines whether two or more normal reference lines are set. In a case where two or more normal reference lines are set (YES in step S507), the processing proceeds to step S508. On the other hand, in a case where the number of normal reference lines is less than two (NO in step S507), a reference line needs to be added, so that the processing proceeds to step S510.

In step S508, the CPU 101 calculates a transformation coefficient utilizing the two or more normal reference lines. The processing in step S508 corresponds to the processing in steps S303 to S305 described in the first exemplary embodiment, and thus a description thereof is omitted.

Subsequently, in step S509, the CPU 101 determines whether the calculation of the transformation coefficient is completed normally. In a case where the calculation of the transformation coefficient is completed normally (YES in step S509), the processing proceeds to step S511. On the other hand, in a case where the calculation of the transformation coefficient cannot be completed normally (NO in step S509), setting of the reference line needs to be reviewed, and the processing proceeds to step S510.

In step S510, the CPU 101 controls the display control unit 106 to display an operation screen that prompts the user to add a reference line.

FIG. 8A is a diagram illustrating an example of an operation screen for designating a reference line, which is displayed on the display device 130 as a result of the processing in step S510. FIGS. 8B to 8D are diagrams illustrating designation of a reference line.

FIG. 8A is the diagram illustrating an example of an operation screen 800 in which a reference line is designated, and illustrates a state where a reference line 811 corresponding to the vertical direction of the subject in the real space has already been set. Although the reference line 811 is an additional reference line designated by the user in the present exemplary embodiment, the reference line 811 may be a reference line identified based on the subject in the image as described in the first exemplary embodiment. An image display region 810, an OK button 820, a cancel button 830, and a message 840 are arranged on the operation screen 800. The captured image is displayed in the image display region 810, and the user can designate a reference line at a freely-selected position in the image display region 810. In the example in FIG. 8A, there is only one designated reference line at this point, and this reference line is displayed as the linear reference line 811. As described in the first exemplary embodiment, two or more reference lines are needed to calculate the transformation coefficient. That is, in a case where the number of reference lines designated at this point is less than two as is the case of the example in FIG. 8A, a reference line needs to be newly added. Hence, the message 840 for prompting the user to additionally designate a reference line is displayed on the operation screen 800.

At this time, in the image display region 810, a recommended region in which a new reference line is to be additionally designated is displayed in a manner recognizable by the user. FIG. 8A illustrates the example in which an additional designation recommended region 812 surrounded by a broken line is displayed in the image display region 810 as the recommended region in which a new reference line is to be additionally designated. The additional designation recommended region 812 is, in a case where a reference line is newly added at any position in the additional designation recommended region 812, a region that is estimated to be suitable for determining the central coordinates of the sector described above based on a combination of the added reference line and the set reference line 811. In a state where a new reference line is not additionally designated yet as illustrated in the example in FIG. 8A, a condition for calculating the transformation coefficient is not satisfied. For this reason, the OK button 820 is displayed, but the function thereof is in a disabled state.

FIGS. 8B to 8D are diagrams illustrating examples of a setting method for setting the additional designation recommended region 812 in the image display region 810 based on the set reference line 811. A region 850 in FIG. 8B, a region 860 in FIG. 8C, and a region 870 in FIG. 8D each represent the image display region 810 in FIG. 8A. A straight line 851 in the image display region 850 in FIG. 8B represents the set reference line and the extension line thereof. Similarly, a straight line 861 in the image display region 860 in FIG. 8C and a straight line 871 in the image display region 870 in FIG. 8D each represent the set reference line and the extension line thereof.

The newly added reference line is utilized when the central coordinates of the sector is calculated in combination with the set reference line. For this reason, the additional designation recommended region is preferably a region, in a case where the reference line is newly added in the region, in which a reference line most suitable for determining the central coordinates of the sector can be set when the added reference line and the set reference line are used in combination. In the present exemplary embodiment, the additional designation recommended region is set such that a position of an intersection point where an extension line of the newly added reference line intersects with the lower side of the image is bilaterally symmetric with respect to a position of an intersection point where an extension line of the set reference line intersects with the lower side of the image with reference to a center point of the lower side of the image.

If subjects in the image to be used as targets for designating reference lines are separated from each other from side to side in the image, it is considered that features of the whole of the image, that is, features representing an amount of distortion of the image are easily estimated. Hence, in a case where the new reference line is additionally designated, it is desirable to designate a reference line having an x-coordinate located at a position closer to the middle of the image than a position of the intersection point where the extension line of the set reference line intersects with the lower side of the image. For this reason, in a case of the image display region 850 illustrated in FIG. 8B, an x-coordinate of the intersection point where the straight line 851 representing the set reference line intersects with the lower side of the image is set as a boundary, and a region 852 is set in the direction toward the middle of the image from the boundary, as the additional designation recommended region for designating the new reference line. In a case of the image display region 860 illustrated in FIG. 8C, an x-coordinate of an intersection point where the straight line 861 representing the set reference line intersects with the lower side of the image is set as a boundary, and a region 862 is set in the direction toward the middle of the image from the boundary, as the additional designation recommended region for designating the new reference line. In a case of the image display region 870 illustrated in FIG. 8D, an x-coordinate of an intersection point where the straight line 871 representing the set reference line intersects with the lower side of the image is set as a boundary, and a region 872 is in the direction toward the middle of the image from the boundary, as the additional designation recommended region for designating the new reference line.

The description will return to the flowchart in FIG. 5.

In a case where the calculation of the transformation coefficient is normally completed (YES in S509), the processing proceeds to step S511. In step S511, the CPU 101 controls the display control unit 106 to display, on the display device 130, an operation screen indicating that the operation of designating the reference lines can be completed.

Figure 9:
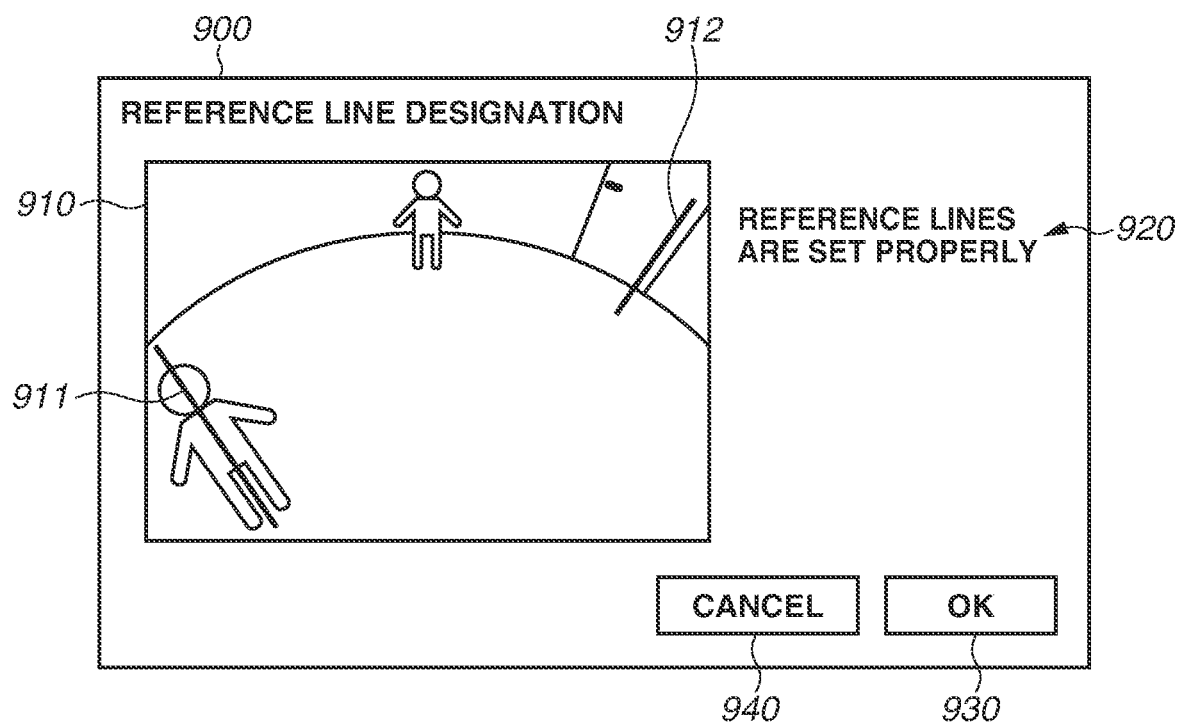
FIG. 9 is a diagram illustrating an example of an operation screen indicating that designation of the reference lines can be completed.

FIG. 9 is a diagram illustrating an example of a reference line designation screen 900 displayed on the display device 130 by the processing in step S511, and illustrates a screen display state when the reference lines necessary for calculating the transformation coefficient are designated properly.

As illustrated in FIG. 9, an image display region 910, an OK button 930, a cancel button 940, and a message 920 are arranged on the reference line designation screen 900. The captured image is displayed in the image display region 910, and reference lines 911 and 920 that can be used for calculating the transformation coefficient are also displayed therein. The message 920 is a text message indicating that the number of designated reference lines is sufficient and this processing can be completed. At this time, a function of the OK button 930 is enabled for the user to fix the designation of the reference lines by pressing the OK button 930.

The processing proceeds to step S512 after step S511. In step S511, the CPU 101 monitors a user operation of editing (adding or correcting) a reference line based on information input from the operation device 150 via the operation control unit 107. In a case where the user operation of editing the reference line is detected (YES in step S512), the processing returns to step S502. In a case where the operation of editing the reference line is performed in step S502 or subsequent steps, the CPU continues the processing similarly to the above with respect to the edited reference line. In a case where the user operation of editing the reference line is not detected (NO in step S512), the processing proceeds to step S513.

In step S513, the CPU 101 monitors, when monitoring the editing of the reference line, whether the OK button 930 is pressed by the user in the operation device 150 via the operation control unit 107. In a case where the OK button 930 is not pressed (NO in step S513), the processing returns to step S512. In a case where the OK button 930 is pressed (YES in step S513), the reference line designation processing of the flowchart illustrated in FIG. 5 ends.

As described above, the second exemplary embodiment enables provision of an operation screen that guides a user so that reference lines are properly designated by the user.

Embodiments of the present disclosure can be achieved by the process of supplying a program for implementing one or more functions of the exemplary embodiments described above to a system or an apparatus via a network or a storage medium, and causing one or more processors in a computer of the system or the apparatus to read and execute the program. Furthermore, embodiments of the present disclosure can be also achieved by a circuit (e.g., application specific integrated circuit (ASIC)) for implementing the one or more functions.

Each of the exemplary embodiments described above is merely an example, and the technical scope of the present disclosure should not be interpreted in a limited manner by the exemplary embodiments.

That is, embodiments of the present disclosure can be implemented in various modes without departing from the technical idea or the principal features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-208266, filed Dec. 16, 2020, which is hereby incorporated by reference herein in its entirety.

What is claimed is:

1. An image processing apparatus comprising:
an identification unit configured to identify, in a first image, a line corresponding to a vertical line in a real space; and
a correction unit configured to correct the first image to be a second image based on respective positions of at least two lines identified in the first image,
wherein the correction unit is configured to:
determine one point based on an intersection point of the at least two identified lines;
define a sector region that has a sector shape of which central coordinates correspond to the determined one point, and that circumscribes the first image;
correct the first image to be the second image based on the sector region;
determine a size of the second image based on the sector region and the first image; and
perform coordinate transformation from the sector region to the second image in accordance with the size.

2. An image processing apparatus comprising:
an identification unit configured to identify, in a first image, a line corresponding to a vertical line in a real space; and
a correction unit configured to correct the first image to be a second image based on respective positions of at least two lines identified in the first image,
wherein the identification unit is configured to extract a plurality of straight lines estimated to correspond to vertical lines in the real space from the first image, and
wherein the correction unit is configured to:
determine one point based on an intersection point of the at least two identified lines;
define a sector region including the first image based on the determined one point;
correct the first image to be the second image based on the sector region;
acquire a plurality of intersection points of the plurality of extracted straight lines; and
determine, from among the plurality of acquired intersection points, a representative value of a plurality of intersection points of which coordinates are within a predetermined range, as the one point.

3. The image processing apparatus according to claim 2, wherein the correction unit is configured to set, as the representative value, an average value or mean value of the coordinates of the plurality of intersection points that are within the predetermined range, or coordinates of a portion at which distribution of the coordinates of the plurality of intersection points that are within the predetermined range is concentrated.

4. The image processing apparatus according to claim 2, wherein the predetermined range is a range of a predetermined width centering on a straight line passing through either a center of a horizontal width of an image or a center of a vertical width of the image.

5. An image processing apparatus comprising:
an identification unit configured to identify, in a first image, a line corresponding to a vertical line in a real space;
a correction unit configured to correct the first image to be a second image based on respective positions of at least two lines identified in the first image; and
a control unit configured to evaluate whether the straight lines designated by a user are appropriate for the determination of the one point, and, in a case where a result of the evaluation indicates that the straight lines are not appropriate for the determination of the one point, perform display that prompts the user to perform checking,
wherein the correction unit is configured to:
determine one point based on an intersection point of the at least two identified lines;
define a sector region including the first image based on the determined one point; and
correct the first image to be the second image based on the sector region.

6. The image processing apparatus according to claim 5, wherein the control unit is configured to, in a case where the straight lines designated by the user intersect with a predetermined side of the first image, evaluate that the straight lines are appropriate for the determination of the one point.

7. The image processing apparatus according to claim 5, wherein the control unit is configured to, in a case of the result of the evaluation indicates that the straight lines designated by the user are not appropriate for the determination of the one point, perform display prompting the user to add a straight line.

8. The image processing apparatus according to claim 5, wherein the control unit is configured to, in a case where the result of the evaluation indicates that the straight lines designated by the user are not appropriate for the determination of the one point, perform display indicating a recommended region in which a straight line is to be added.

9. The image processing apparatus according to claim 8, wherein the control unit is configured to set the recommended region such that a position of an intersection point where a straight line newly designated by the user intersects with a predetermined side of an image is bilaterally symmetric with respect to a position of an intersection point where a set straight line intersects with the predetermined side of the image with reference to a center point of the predetermined side of the image.

10. The image processing apparatus according to claim 9, wherein the control unit is configured to set, as the recommended region, a region in a direction toward a middle of the image from the intersection point where the set straight line intersects with the predetermined side of the image serving as a boundary.

11. A method comprising:
- identifying, in a first image, a line corresponding to a vertical line in a real space; and
- correcting the first image to be a second image based on positions of at least two lines identified in the first image, wherein the correcting includes:
  - determining one point based on an intersection point of the at least two identified lines;
  - correcting the first image to be the second image based on the sector region;
  - defining a sector region that has a sector shape of which central coordinates correspond to the determined one point, and that circumscribes the first image;
  - determining a size of the second image based on the sector region and the first image; and
  - performing coordinate transformation from the sector region to the second image in accordance with the size.

12. The method according to claim 11,
wherein the identifying includes extracting a plurality of straight lines estimated to correspond to vertical lines in the real space from the first image, and
wherein the correcting includes:
- acquiring a plurality of intersection points of the plurality of extracted straight lines; and
- determining, from among the plurality of acquired intersection points, a representative value of a plurality of intersection points of which coordinates are within a predetermined range, as the one point.

13. The method according to claim 12, wherein the correcting includes setting, as the representative value, an average value or mean value of the coordinates of the plurality of intersection points that are within the predetermined range, or coordinates of a portion at which distribution of the coordinates of the plurality of intersection points that are within the predetermined range is concentrated.

14. The method according to claim 13, wherein the predetermined range is a range of a predetermined width centering on a straight line passing through either a center of a horizontal width of an image or a center of a vertical width of the image.

15. A non-transitory computer-readable medium storing a program for causing a computer to execute an image processing method, the method comprising:
- identifying, in a first image, a line corresponding to a vertical line in a real space; and
- correcting the first image to be a second image based on positions of at least two lines identified in the first image, wherein the correcting includes:
  - determining one point based on an intersection point of the at least two identified lines;
  - correcting the first image to be the second image based on the sector region;
  - defining a sector region that has a sector shape of which central coordinates correspond to the determined one point, and that circumscribes the first image;
  - determining a size of the second image based on the sector region and the first image; and
  - performing coordinate transformation from the sector region to the second image in accordance with the size.

\* \* \* \* \*